(12) United States Patent
De Crouy-Chanel

(10) Patent No.: US 6,405,059 B2
(45) Date of Patent: Jun. 11, 2002

(54) TELEPHONE COMPRISING AN AUTOMATIC CALLING DEVICE THAT COMPARES PHONE NUMBER FIELDS FOR COMPOSITION OF THE DIALED NUMBER

(75) Inventor: Rémy De Crouy-Chanel, Le Mans (FR)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 09/342,816

(22) Filed: Jun. 29, 1999

(30) Foreign Application Priority Data

Jun. 30, 1998 (FR) .............................................. 9808304

(51) Int. Cl.[7] .............................................. H04M 1/27
(52) U.S. Cl. .................................. 455/564; 379/355.08
(58) Field of Search .............................. 455/564, 566, 455/458, 460; 379/355, 356, 357, 221.14, 355.08

(56) References Cited

U.S. PATENT DOCUMENTS

| 5,268,959 | A | * | 12/1993 | Hong | 379/356 |
| 5,305,372 | A | * | 4/1994 | Tomiyori | 379/59 |
| 5,455,858 | A | * | 10/1995 | Lin | 379/355 |
| 5,594,790 | A | * | 1/1997 | Curreri | 379/265 |
| 5,719,931 | A | * | 2/1998 | Johnson | 379/356 |
| 5,722,088 | A | | 2/1998 | Storn et al. | 455/564 |
| 5,933,478 | A | * | 8/1999 | Ozaki | 379/93.24 |
| 6,192,124 | B1 | * | 2/2001 | Yim | 379/356 |
| 6,310,948 | B1 | * | 10/2001 | Nemeth | 379/213.01 |

FOREIGN PATENT DOCUMENTS

| EP | 0526832 A2 | 2/1993 | .......... H04M/1/274 |
| EP | 0530010 A2 | 3/1993 | .......... H04M/1/274 |

* cited by examiner

*Primary Examiner*—Daniel Hunter
*Assistant Examiner*—Nick Corsaro
(74) *Attorney, Agent, or Firm*—Dicran Halajian

(57) ABSTRACT

A mobile telephone includes a memory for storing data in at least three fields for forming a dialed telephone number. The three fields include a first field containing the country code associated with the desired telephone number; a second field containing the area code associated with the desired telephone number; and a third field containing the desired telephone number. The mobile telephone further includes a dialer. When the dialer dials data contained in the three fields to establish a call the call is not established, then the dialer redials data contained in the first and third fields. When the dialer dials data contained in the second and third fields to establish a call, and if the call is not established, then the dialer adds a predetermined prefix and redials the data contained in the second and third fields.

7 Claims, No Drawings

TELEPHONE COMPRISING AN AUTOMATIC CALLING DEVICE THAT COMPARES PHONE NUMBER FIELDS FOR COMPOSITION OF THE DIALED NUMBER

FIELD OF THE INVENTION

The present invention relates to a mobile telephone comprising an automatic calling device notably including storage means for storing data representing the telephone numbers of called parties, subdivided into at least three areas intended for the programming of three separate data fields;

programming means for programming the contents of said fields, provided for putting in the first field a first code which represents various countries where the called parties are located, in the second field a second code which represents a prefix which is linked with the country where said called parties are located and with the relative location of the user and of the called party, and in the third field a third code which represents said called party's private number;

detection means for detecting the contents of said fields while the user of the telephone is calling a called party;

calling means for calling as a function of the results of said detections.

BACKGROUND OF THE INVENTION

U.S. Pat. No. 5,722,088 describes an embodiment of a mobile telephone in which the telephone number s of the party the user calls most frequently can be stored in a memory and the number he wishes is dialled by way of an automatic searching device. These telephone numbers are formed by two parts: a prefix, which depends on the place where the user is (and possibly on the network or the operator chosen), followed by the private number of the called party (in France 9 digits at present).

When the private number of a called party is stored in the telephone repertoire or on a card of the SIM type (SIM=Subscriber Identity Module; in a mobile GSM type of telephone this relates to the card—of the credit card format or of a smaller format—which contains all the user's own data and which is removable and can thus be transferred from one telephone to another), the number of the called party may be programmed in two different modes: in a local mode or in an international mode.

In the local mode, all the programmed digits are systematically dialled by the automatic searching device at whatever place the user who calls is, and whatever cell his mobile telephone is connected to. For this reason, the dialled prefix always remains the same and a number ordinarily dialled from abroad (for a specific called party) is no longer correctly interpreted by the network when the user is in the country of this called party. Similarly holds for the other way around, when the user who is habitually in the same country as a called party calls him, this time from abroad.

In the international mode, the programming consists of programming the sign <<+>> followed by the country code where the called party is, and then only thereafter, the nine digits of this called party. The drawback thus resides in the fact that the user either has to know the country code of the called party or have the numbers of the called parties programmed in an international mode which he habitually dials in a local mode.

SUMMARY OF THE INVENTION

It is thus an object of the invention to propose a telephone comprising an automatic calling device which can be used irrespective of the place where the user is, and of the network or cell to which the mobile telephone is connected.

For this purpose, the invention relates to a telephone such as described in the introductory paragraph of the application and which is moreover the detection of a first empty field or, in contrast, programmed field corresponds to a call that has either or not been effected within the frontiers of the country where the user and the called party are located;

the detection of a second empty field or, in contrast, programmed field corresponds, when the first field itself is programmed, to an international type of call with or without a prefix respectively, of the number of the called party;

the detection of a second programmed field or, in contrast, empty field corresponds, when the first field itself is empty, to a call in the local mode, the choice of either an operator and the associated calling network or, in contrast, of a database network being then possible.

In a variant of embodiment, the storage means provided may also include a fourth area intended for a code conversion table between a list of said first codes which represent the countries where the called party is located—or of the prefixed associated to said countries—and a list on which said countries are clearly designated, and means for recognizing such a designation.

DESCRIPTION OF PREFERRED EMBODIMENTS

At present, a mobile telephone generally comprises an automatic calling device or at least a calling help device that prevents the user from having to systematically dial the number of the called party. A specific feature of the calling device according to the invention is that it comprises, in a dialling automaton, a memory subdivided into three separate fields and managed in a particular manner: actually, in this memory, which is inside the telephone itself or on the SIM card, the first field contains a first specific data which determines without ambiguity the country of the called party. This data may be programmed and displayed with the aid of a group of signs (for example, one, two or three characters selected in conformity with the registration letters which point out where vehicles come from). The presence of signs in this first field means that the programmed number is not a local number; in contrast, their absence indicates that the programmed number is a local number (and that, as will be seen hereafter, the digits contained in the other fields will have to be dialled systematically).

With respect to this first field, the operation of the automatic calling device is the following, depending on whether this is about the programming step of the field or the calling step itself:

the moment this field is programmed, the device makes it possible to display on the basis of a prerecorded but modifiable list, on the one hand, a group of one or various characters (generally one, two or three will suffice) which are associated to the country of the called party, and, on the other hand, the name of this country. When the desired country is displayed, it is validated and the inscription of the country on the display fades away while the associated group of characters is arranged in the list in the memory. During possible updates of this list the user may no longer be presented with this list in alphabetical order (or in another pre-established order), but in a decreasing frequency of use.

the moment the user calls a called party, the contents of the telephone repertoire (that is to say, of the prerecorded list according to the programming step described above) is recalled, either by switching and selecting the country, or by a direct selection made via a voice-controlled interface or a similar device, and the contents of the first field stored in the list is displayed at the same time (for reminding the user of the called party's country).

The second one of the three separate fields of the memory corresponds, at present, to the digit which one often puts between parentheses on manual repertoires or on name cards. In a general manner, this digit is only dialled if the called party is situated in the same country as the place where the user calls, or as the cell to which the mobile telephone is connected.

For this reason, if no country has been selected (first field free or empty) at the moment of programming and if the second field is also free or empty, only the digits of the third field—which contains the called party's number—are dialled by the dialling automaton: this process corresponds to the local programming mode, that allows especially to establish a link with database networks. If, on the other hand, this second field contains a digit, the automaton dials this digit before dialling the digits of the third field: this process corresponds to the possibility to choose for the long-distance calls in the same country an operator and therefore the calling network associated to said operator.

If, on the other hand a country has been selected at the moment of programming and when the second field is free or empty, an international type of numbering is carried out then. If the second field contains a digit, the automaton dials this digit before dialling the digits of the third field. If the network refuses, or if this digit cannot be interpreted, the automaton behaves as if this second field was free or empty.

When the mobile telephone is connected to a network, it knows the characteristic features of this network and those of the SIM card it uses. It may thus automatically know the prefix to be dialled before the part of the number which is specific of the sought called party, and this whatever the location where the user is, without this user having to remember the international code of his called party which is directly suggested to him.

For example, rather than programming <<+33>> in the repertoire, which is the international number of France, followed by the nine digits of the called party, the user will select <F> at the moment of programming, followed by a digit which will appear between parentheses, and then the nine digits of his called party. Thus, at the moment of a call:

(a) if the first field is empty or if no country is validated, the dialling automaton makes no decision and will read the second field;

(b) if this second field is also empty, the dialling automaton systematically dials the digits programmed in the third field;

(c) if the second field contains a digit, this digit is dialled if the network or the cell to which the telephone is connected authorizes the automaton to do so: if the call does not reach its destination, the complete number is then re-dialled by adding thereto the digit defined by default (in France <<0>>); and (d) if <<F>> (for example) is present in the first field, which means that the number of the called party is a French number, the dialling automaton dials <<0033>>, or the equivalent of a current programming of <<+33>>, then—if the user is abroad—does not dial the digit of the second field which corresponds to the digit between parentheses, but only the digits programmed in the third field or, in contrast—if the user is in France, that is to say, in the same country as his called party—dials the number of the second field (if the network authorizes the automaton to do so) followed by the nine other digits of the third field.

A memory area or an autonomous memory may be provided to ensure a transcoding function which permits the dialling automaton to associate the characters predefined in the first field to the country code of the destination country, for example, <<F>> to <<+33>> for France, or <<I>> to <<+39>> for Italy. Such a coding is currently standardized, but the codes thus defined may possibly be modified or their list expanded. In that case, a specific procedure may be provided for updating the transcoding table either automatically or by simply authorizing the user to carry out this updating himself.

What is claimed is:

1. A mobile telephone comprising:
   a memory for storing data in at least three fields for forming a dialed telephone number;
   said at least three fields including:
      a first field containing a country code associated with a desired telephone number;
      a second field containing an area code associated with said desired telephone number; and
      a third field containing said desired telephone number;
      said mobile telephone further comprising a dialer which dials data contained in said at least three fields to establish a call, wherein if said call is not establish, then said dialer redials data contained in said first field and said third field without intervention of a user of said mobile telephone.

2. The mobile telephone of claim 1, wherein when said dialer dials data contained in said second field and said third field to establish a call, and if said call is not established, then said dialer adds a predetermined prefix and redials said data contained in said second field and said third field.

3. The mobile telephone of claim 1, wherein said first field contains a character indicative of a country associated with said country code.

4. The mobile telephone of claim 1, wherein said memory further stores a list of countries and associated country codes, and wherein said country code is selected from said list.

5. A mobile telephone comprising:
   a memory for storing data in at least three fields for forming a dialed telephone number;
   said at least three fields including:
      a first field containing a country code associated with a desired telephone number;
      a second field containing an area code associated with said desired telephone number; and
      a third field containing said desired telephone number;
      said mobile telephone further comprising a dialer which dials data contained in said second field and said third field to establish a call, wherein if said call is not established, then said dialer adds a predetermined prefix and redials said data contained in said second field and said third field without intervention of a user of said mobile telephone;
      wherein when said dialer dials data contained in said at least three fields to establish a call and if said call is not established, then said dialer redials data contained in said first field and said third field.

6. The mobile telephone of claim 5, wherein said first field contains a character indicative of a country associated with said country code.

7. The mobile telephone of claim 5, wherein said memory further stores a list of countries and associated country codes, and wherein said country code is selected from said list.

* * * * *